United States Patent
Fujioka

(10) Patent No.: US 8,876,957 B2
(45) Date of Patent: Nov. 4, 2014

(54) ADSORPTION ROTOR

(71) Applicant: Seibu Giken Co., Ltd., Fukuoka (JP)

(72) Inventor: Yuji Fujioka, Fukuoka (JP)

(73) Assignee: Seibu Giken Co., Ltd., Fukuoka (JP)

(*) Notice: Subject to any disclaimer, the term of this patent is extended or adjusted under 35 U.S.C. 154(b) by 77 days.

(21) Appl. No.: 13/728,049

(22) Filed: Dec. 27, 2012

(65) Prior Publication Data

US 2013/0186277 A1    Jul. 25, 2013

(30) Foreign Application Priority Data

Dec. 27, 2011 (JP) ................. 2011-284932

(51) Int. Cl.
| | | |
|---|---|---|
| *B01D 53/06* | (2006.01) | |
| *B01D 53/26* | (2006.01) | |
| *F24F 3/14* | (2006.01) | |
| *F28D 19/04* | (2006.01) | |

(52) U.S. Cl.
CPC ......... *B01D 53/06* (2013.01); *F24F 2203/1012* (2013.01); *B01D 53/261* (2013.01); *F24F 3/1423* (2013.01); *F28D 19/042* (2013.01); *B01D 2253/108* (2013.01); *B01D 2253/3425* (2013.01); *B01D 2257/708* (2013.01); *B01D 2257/80* (2013.01); *B01D 2257/90* (2013.01); *B01D 2258/0258* (2013.01); *B01D 2259/40088* (2013.01); *F24F 2203/108* (2013.01)
USPC .............................................. 96/125; 96/151

(58) Field of Classification Search
CPC ................. B01D 53/06; B01D 53/251; B01D 2253/108; B01D 2253/3425; B01D 2257/708; B01D 2257/80; B01D 2257/90; B01D 2258/0258; B01D 2259/40088; F24F 3/1423; F24F 2203/108; F24F 2203/1012; F28D 19/042; F28D 19/044
USPC ............ 96/123, 125, 151, 154; 95/113; 165/8
See application file for complete search history.

(56) References Cited

U.S. PATENT DOCUMENTS

| | | | | |
|---|---|---|---|---|
| 3,314,472 A | * | 4/1967 | Casagrande et al. ............. | 165/10 |
| 3,789,916 A | * | 2/1974 | Lindahl ........................... | 96/125 |
| 5,595,238 A | * | 1/1997 | Mark et al. ........................ | 165/9 |
| 5,960,166 A | * | 9/1999 | Brown et al. ................. | 358/1.15 |
| 6,527,837 B2 | * | 3/2003 | Kurosawa et al. ............... | 96/125 |
| 6,783,738 B1 | * | 8/2004 | Sasaki et al. ................... | 422/173 |

FOREIGN PATENT DOCUMENTS

| | | |
|---|---|---|
| JP | 2003-126641 | 5/2003 |
| JP | 2004-25132 | 1/2004 |
| JP | 2006-90572 | 4/2006 |

* cited by examiner

*Primary Examiner* — Frank Lawrence
(74) *Attorney, Agent, or Firm* — Staas & Halsey LLP

(57) ABSTRACT

An adsorption rotor has a surface layer which can be detached and replaced when performance degrades. A metal aggregate is extended in the width direction of the rotor element so that attachment-and-detachment adsorption rotor elements can be attached thereto using bolts and a perimeter griddle fixing bracket, thus resulting in protecting an upper part of the integral-type adsorption rotor element. In this way, the weight of the attachment-and-detachment adsorption rotor elements can be made light, resulting in them being fixable only using bolts, without special tools or skilled technicians. Moreover, because the detachment-and-replacement procedures can be performed from a rotor spindle side, thus from inside of a chamber, a heavy industrial machine is not required.

5 Claims, 9 Drawing Sheets

--PRIOR ART--

ADSORPTION ROTOR

CROSS REFERENCE TO RELATED APPLICATIONS

This application is based on and hereby claims priority to Japanese Application No. 2011-284932 filed on Dec. 27, 2011, the contents of which are hereby incorporated by reference.

BACKGROUND

This invention is concerned with an adsorption rotor whose surface layers only need to be replaced, when performance of the adsorption rotor deteriorates, or when an adsorption rotor surface layer gets clogged.

An adsorption rotor functions as either an absorber of volatile organic compounds (hereafter called "VOC") which are then released to make them denser, or as a dehumidifier by adsorbing moisture in air, using hydrophobic zeolite, activated carbon, hydrophilic zeolite, or silica gel.

For the case of an adsorption rotor which functions as an adsorption-concentrator of VOCs, such materials as an activated carbon or a hydrophobic zeolite are used as adsorbents. Among these, a rotor using hydrophobic zeolite is nonflammable, and therefore has the advantage of avoiding a serious accident even if the VOCs adsorbed by the rotor catch fire by catalyst of the active carbon.

Moreover, both a hydrophilic zeolite and a hydrophobic zeolite have a heat resistance of more than 300° C., and adsorbed VOCs can be desorbed nearly completely by passing desorption air having a high temperature of not less than 300° C. This is helpful when VOCs having a high boiling point are adsorbed.

The adsorption rotors used for the adsorption removal of VOCs or for a dehumidifier are manufactured as shown in FIG. 1 at considerable fabrication cost, where the whole unit is made up from the separate parts of a metal aggregate boss 2, a reinforcement griddle 3, a perimeter angle 4, and a perimeter griddle 5. On the other hand, a large-sized rotor has a diameter of more than 4 m. In order to facilitate easy handling in case of transporting the rotor to the installation spot, it is divided into two or more sector pieces as shown in FIG. 2, which are then assembled at the spot. The technology about such a divided-type adsorption rotor was disclosed in JP 2004-025132. In addition, the technology about the divided-type adsorption rotor equipped with two or more adsorption blocks having the capability of suppressing crack formation in the rotor was disclosed in JP 2003-126641.

The replacement with a new adsorption rotor is required, when the rotor element deteriorates or performance of the above-mentioned adsorption rotor becomes lower due to clogging on the rotor surface by dust accumulation from operating for a long time, or paint mist being transformed to the liquid phase from the gaseous phase due to a temperature decrease when the rotor is used to adsorb paint solvents at a painting booth. The initial manufacturing cost of an integral-type rotor is comparatively cheap. However, when there is no exchange space, the rotor must be disassembled, and it will have to be exchanged with a new rotor, resulting in excessive time and effort for the exchange and thus an increase in the cost of exchange. On the other hand, the initial cost of a divided-type rotor is comparatively high. However, the sectors can be easily exchanged by removing the bolts etc. which are fixing the sector pieces, resulting in a decrease in the cost of exchange. In addition, the technology of equipping a fixed-type dust-collector was disclosed in JP 2006-090572, which aims to prevent contamination of such a rotor.

As mentioned above, in the case of the integral-type adsorption rotor shown in FIG. 1, there occurs much waste of material because rotor elements other than the deteriorated surface must be changed. Moreover, since the rotor to be exchanged is heavy, heavy industrial equipment etc. are needed during the exchange, thus increasing the replacement cost. For the case of the divided-type adsorption rotor shown in FIG. 2, it is necessary to strengthen every sector piece to be exchanged, in order to make the metal aggregate as strong as an integral-type rotor, resulting in the increase in an initial cost. In addition, whole rotor elements other than the deteriorated surface side have to be exchanged, resulting in much waste of material, similar to the case of the integral-type adsorption rotor.

For the case disclosed in JP 2006-090572, there is no capability of adsorption/desorption at the portion of a fixed-type dust-collecting filter, resulting in an easier formation of clogs than a portion of a honeycomb adsorption element, and the width of the rotor becomes wider than that for a rotor without the filter having the same performance. In other words, in the case of a honeycomb-like adsorption element, after VOCs adhere to the surface, they can be desorbed by desorption air. When VOCs adhere to the portion of the fixed mount type dust-collecting filter as disclosed in the patent document 2, it is not desorbed by desorption air, resulting in an easy formation of clogs.

SUMMARY

One potential goal is to offer an adsorption rotor where only deteriorated portions can be detached and then be replaced with new portions without greatly increasing the initial cost or attachment-and-detachment cost, when performance of the adsorption rotor element degrades.

The inventor proposes the ability for replacement of only the deteriorated surface side of the adsorption rotor, when degradation and/or performance decrement occurs.

The inventor proposes an adsorption rotor that enables the attachment-and-detachment of an adsorption rotor surface side to be made only by changing the structure of metal aggregates. In addition, the rotor has an advantage that it can be introduced into an already existing adsorption rotor, because there is no change in the outer diameter etc.

By dividing the adsorption rotor in a width direction and piling up the divided portions, the honeycombs of the two adsorption rotor elements shift and a turbulent airflow occurs in the honeycombs. Due to this effect, a wind air uniformly over the honeycombs, where adsorbents are attached, resulting in an improvement in performance, compared with the integral-type and divided-type adsorption rotors where flow is laminar.

Moreover, since only the surface side is replaced, the weight is light. Thus, because the portion to be replaced can be fixed using bolts, special tools for replacement are unnecessary, and unskilled personnel can easily perform this work. By this arrangement, the exchange time can be reduced to about ⅓ and the exchange cost is accordingly reduced, as compared with an integral-type or a divided-type rotor. Moreover, in case of generating dry air for the dehumidifying purpose or of desorbing VOCs for a paint booth, for example, if the quality of air to be processed is at a level which does not affect a human body, the attachment-and-detachment procedures may be carried out while the system is in operation.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
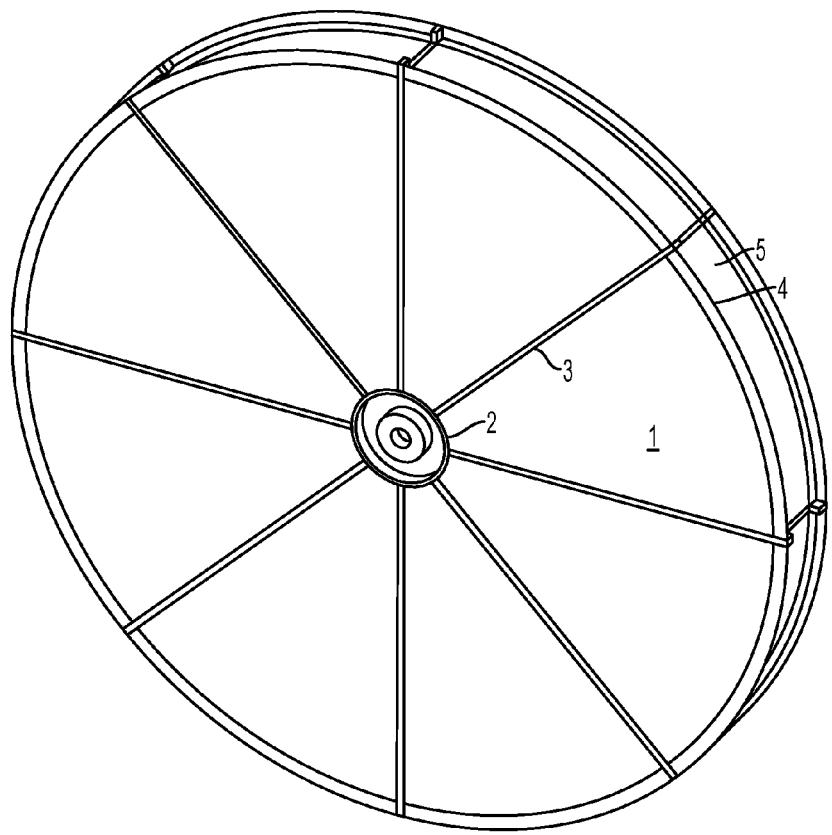
FIG. 1 shows an oblique view of the conventional integral-type adsorption rotor.
Figure 2:
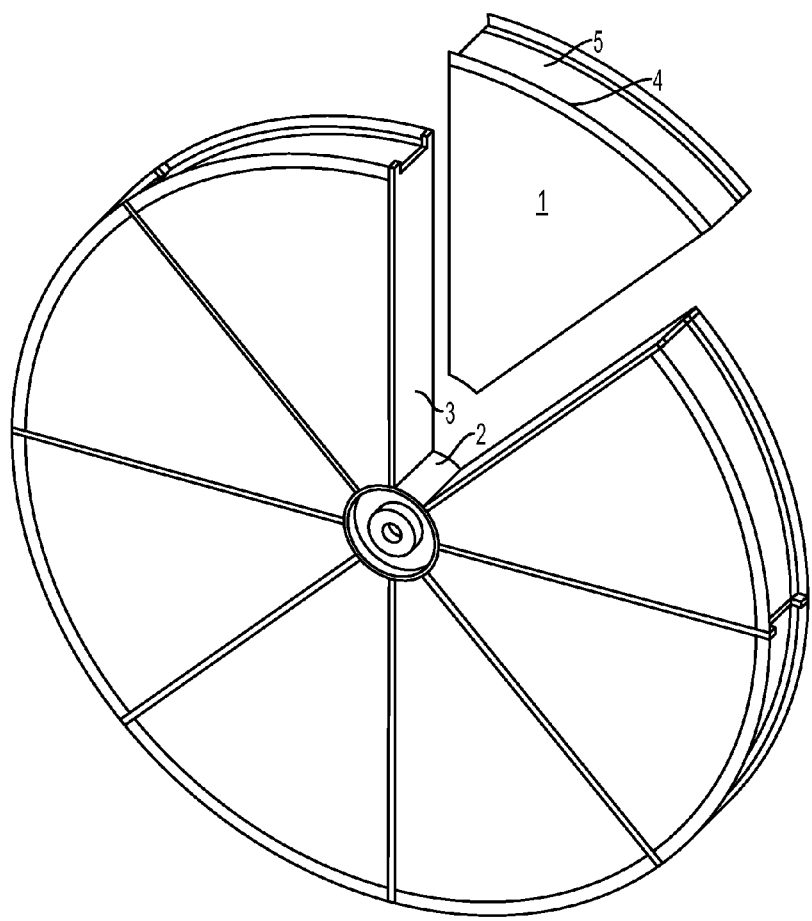
FIG. 2 shows an oblique view of the conventional divided-type adsorption rotor.

Reference will now be made in detail to the preferred embodiments of the present invention, examples of which are illustrated in the accompanying drawings, wherein like reference numerals refer to like elements throughout.

With the inventor's proposals, the detachment and replacement of only the surface side of an adsorption rotor can be easily carried out without increasing an initial cost or the attachment-and-detachment cost, when degradation and/or performance decrement, etc. of a rotor element occurs.

First Embodiment

Figure 3:
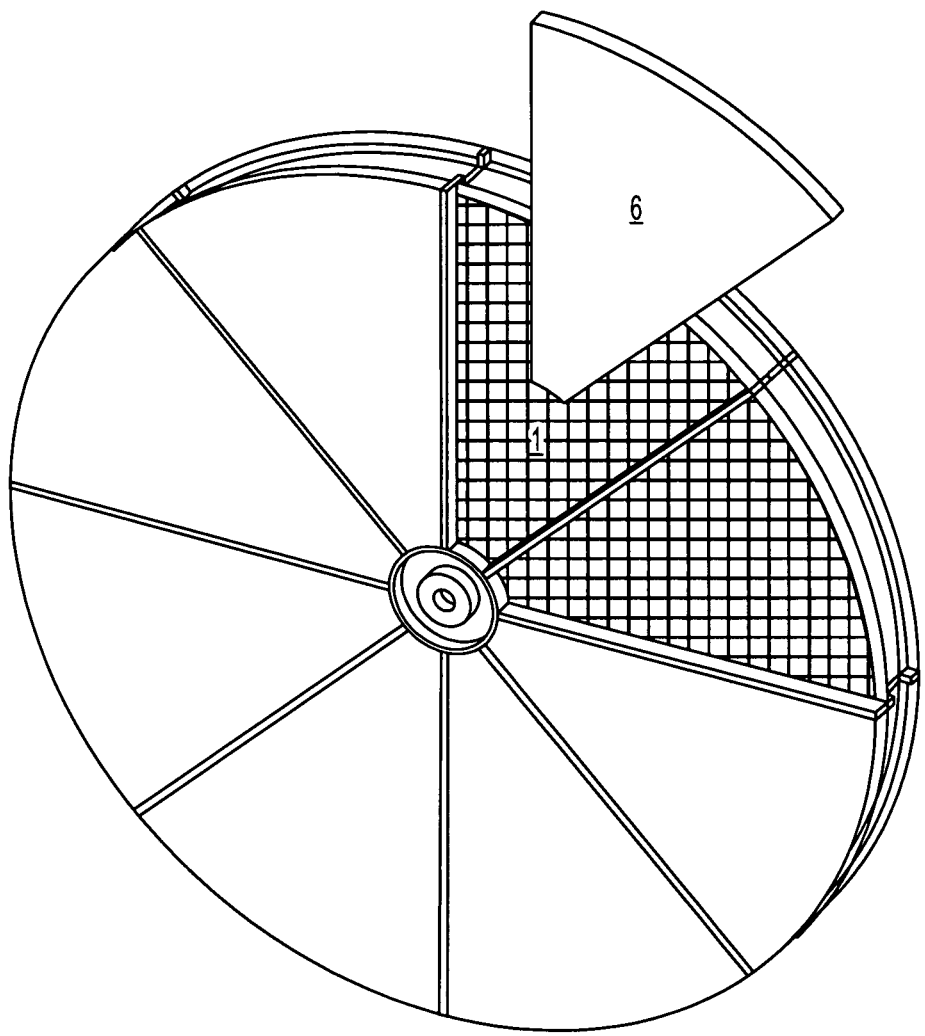
FIG. 3 shows an oblique view of the first embodiment of the proposed integral-type partially divided-type adsorption rotor.
Figure 6:
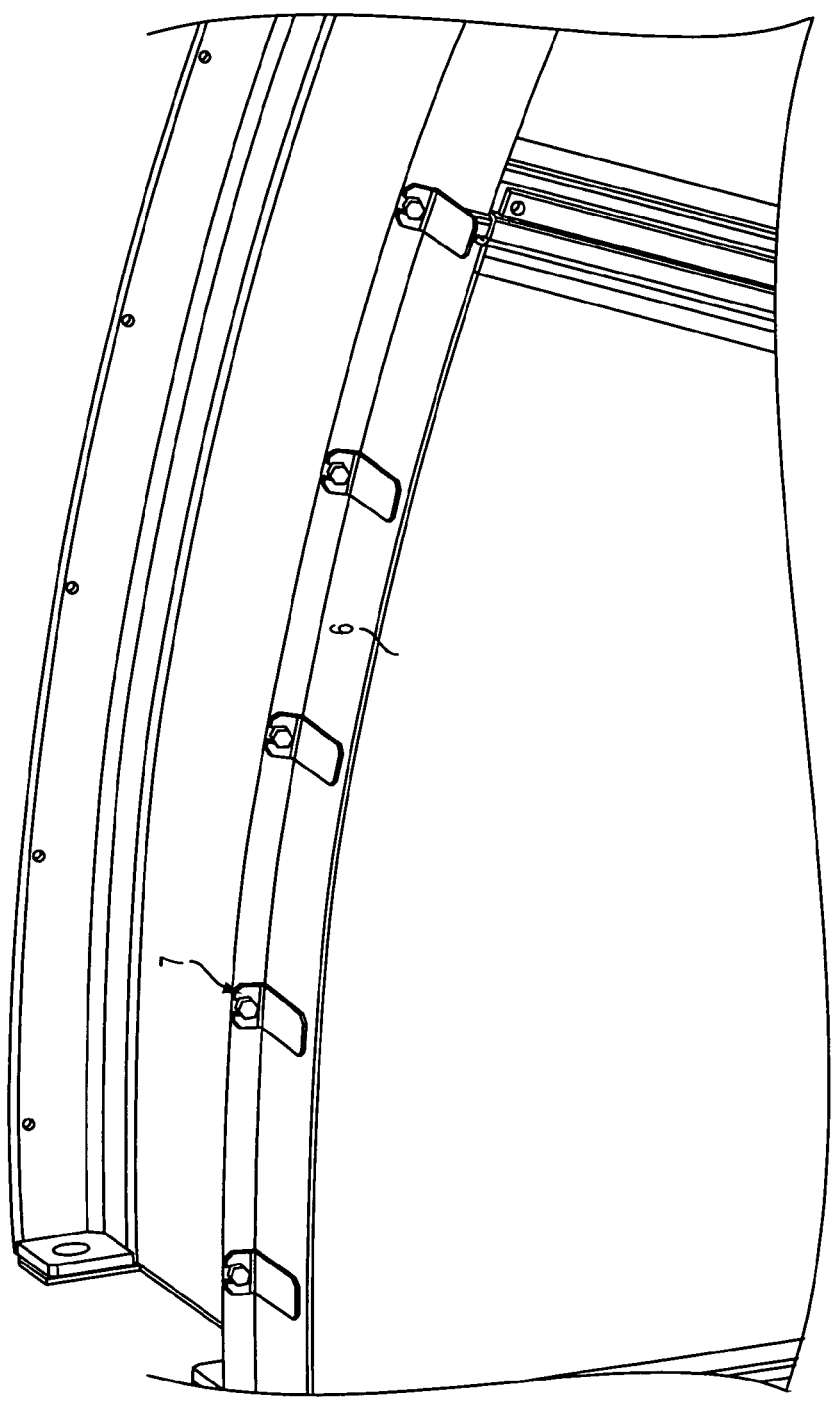
FIG. 6 is an enlargement of the attachment-and-detachment portion of the adsorption rotor for the proposed integral-type partially divided-type adsorption rotor.

The conventional integral-type adsorption rotor has the shape shown in FIG. 1, where fan-shaped honeycombs 1 are fixed to the rotor integrally using a boss 2, the reinforcement griddle 3, the perimeter angle 4, and the perimeter griddle 5, all being made of metal aggregates. The first embodiment has the shape of either FIG. 3 or FIG. 6 and is an integral-type partially divided-type adsorption rotor. Here, the attachment-and-detachment adsorption rotor element 6 is placed on the upper part of the integral-type adsorption rotor element 1 to protect it in the direction of the rotor width by being fixed using bolts at the perimeter griddle fixing bracket 7, which is made possible by extending the metal aggregates. Because the weight of the attachment-and-detachment adsorption rotor element 6 is light, bolt-fixing is enabled and unskilled personnel can easily carry out the detachment-and-attachment procedures without using special tools for the work. Moreover, it is also possible to detach and replace the adsorbing rotor element 6 from the rotor shaft side, thus enabling the procedure to be carried out from inside the rotor chamber. Thus, if the air is not dangerous to personnel wearing a protective garment in the chamber, the procedures could be carried out while the rotor is in operation without using heavy industrial equipment, thus enabling a substantial reduction in the replacement procedures.

Second Embodiment

Figure 7:
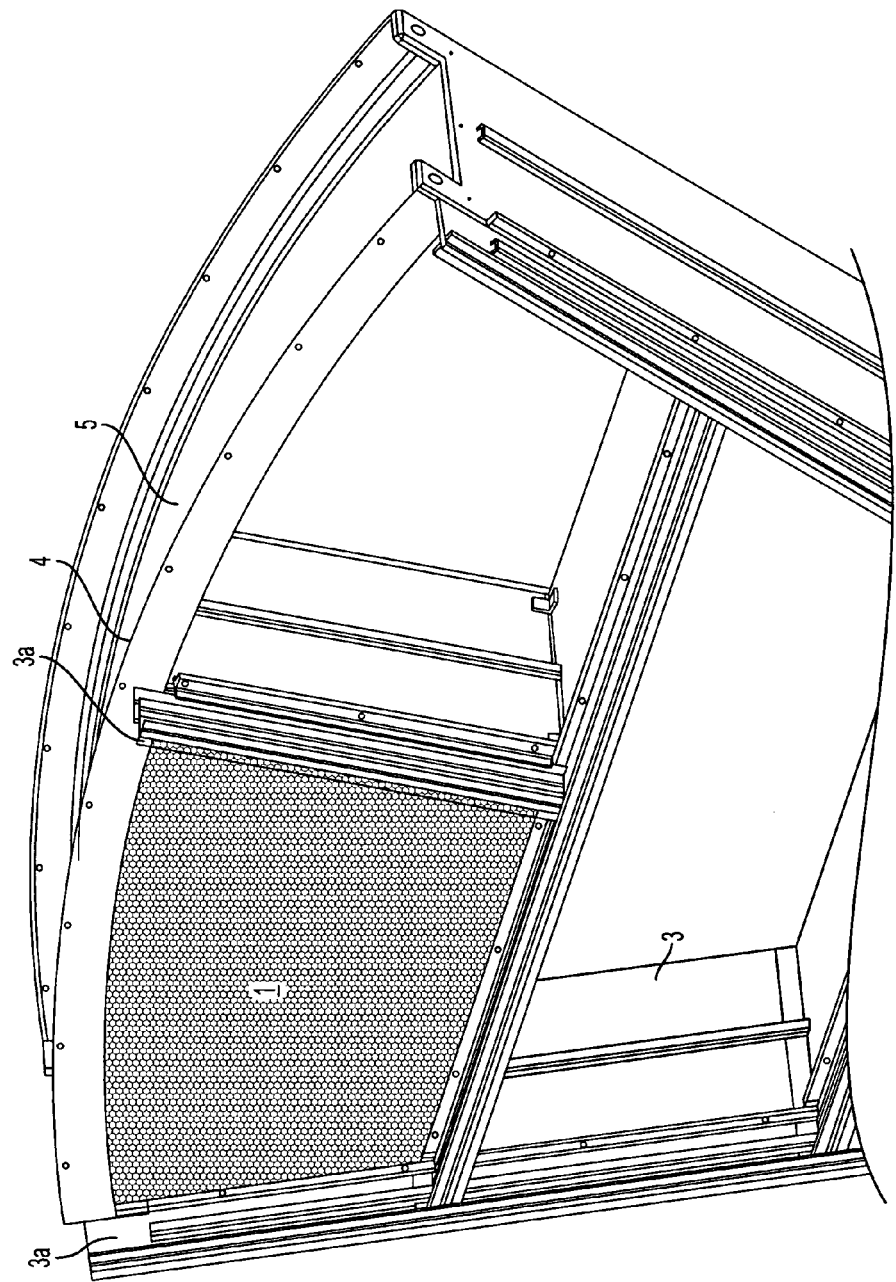
FIG. 7 is an oblique view of the perimeter portion of the integral-type partially divided-type adsorption rotor of the second embodiment.
Figure 8:
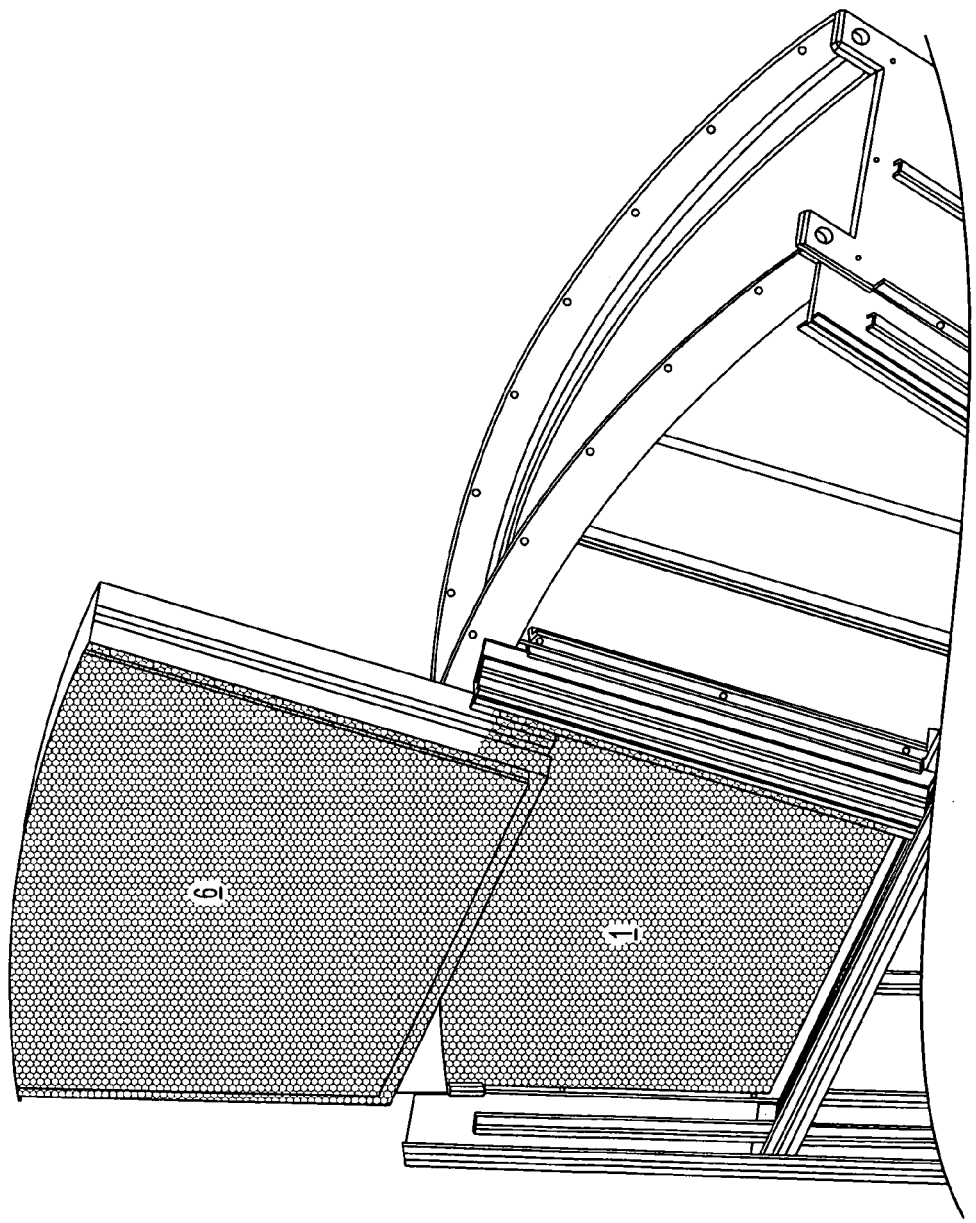
FIG. 8 shows the perimeter portion of the integral-type partially divided-type adsorption rotor of the second embodiment.
Figure 9:
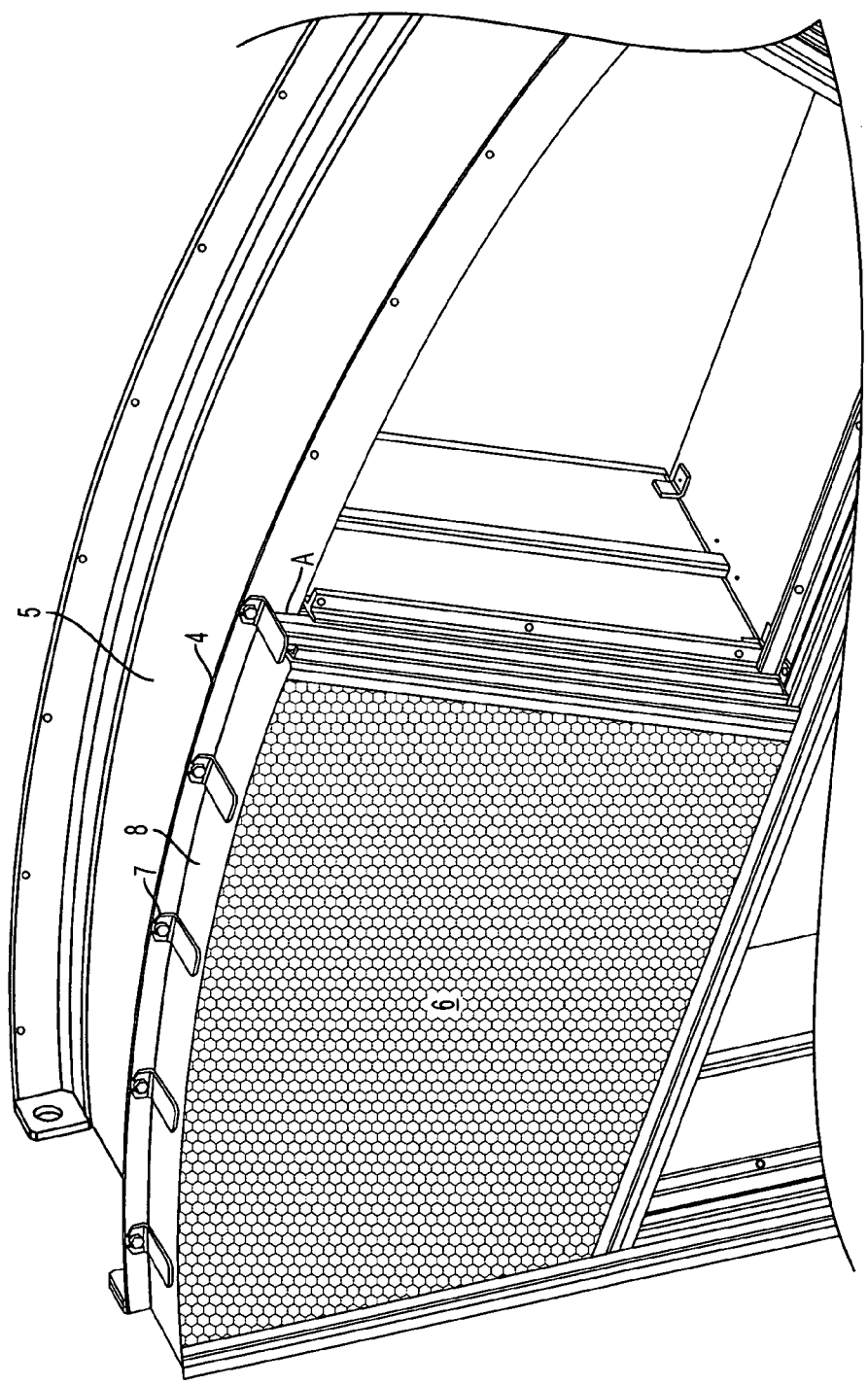
FIG. 9 shows the perimeter portion of the integral-type partially divided-type adsorption rotor of the second embodiment.

The second embodiment is described using FIGS. 7, 8, and 9. In case the diameter of the rotor exceeds 4 m, the weight of the attachment-and-detachment adsorption rotor element 6 becomes heavy. In this case, it is advisable to divide the diameter of the adsorption rotor during the production process. For this case, a metal aggregate 3a in FIG. 7, which protects the upper part of the integral-type adsorption rotor element 1, is put on the width direction of the rotor element so that the attachment-and-detachment adsorption rotor elements 6 may pile up. Then, as shown in FIG. 8, the attachment-and-detachment adsorption rotor element 6 is inserted into the metal aggregate 3a. Thereafter, as shown in FIG. 9, the attachment-and-detachment adsorption rotor element 6 is held down by a perimeter griddle 8 from the adsorption rotor perimeter side, and is fixed using bolts perimeter griddle fixing elements 7. Similar to the first embodiment, a strong structure at the perimeter of the attachment-and-detachment adsorption rotor element 6 and a large quantity of caulking become unnecessary, because leaks of processing air or reproduction air are suppressed by the overlapping portion A of the perimeter angle 4 with the attachment-and-detachment adsorption rotor element 6.

With regard to the direction (side) where the replaceable attachment-and-detachment adsorption rotor element is used, when clogs are anticipated at an entrance side of the adsorption rotor due to paint mist etc., the replaceable element is used at the entrance side. On the other hand, when degradation occurs at the reprocessing side of the adsorption rotor due to heating polymerization, the replaceable element is used at the reprocessing side. It is possible to reuse the detached portion of the attachment-and-detachment rotor by carrying out calcination procedures. In this case, it is advisable to make the width 100 mm or less because, because if it is too wide, the calcination temperature will be too high, presenting a fire risk at the time of calcination.

When clogging is caused by polymerization of high boiling point substances adhering to the attachment-and-detachment rotor element, a catalyst may be used for regeneration. There is a concern of the rotor element catching fire if too much catalyst exists there. However, by reducing the amount of catalyst by making the width of the attachment-and-detachment rotor element thin, the danger of catching fire can be greatly reduced. Moreover, when the composition of VOCs to be processed changes, it is possible to change to a different hydrophobic zeolite which may be suitable for the new composition.

It has already known that the length of a run-up section Xe, which is the distance from the leading edge of the honeycombs to the point where laminar flow of air changes to turbulent flow, is described by the following Equation 1 using the Reynolds number Re for the equivalent diameter d of the honeycombs. For example, if the air speed is 2 m/s with the height of 1.8 mm and pitch of 3.4 mm of the honeycomb, respectively, the length of the run-up section Xe becomes 15.97 mm. When the airflow in the honeycombs is turbulent, the probability that dust contained in the air, paint mist, etc. may adhere to the honeycomb surface becomes high. Therefore, the width the attachment-and-detachment adsorption rotor element should be more than the above-mentioned length of the run-up section and less than half of the rotor width.

Xe is approximately equal to 0.5×Re×d  Equation 1

Figure 4:
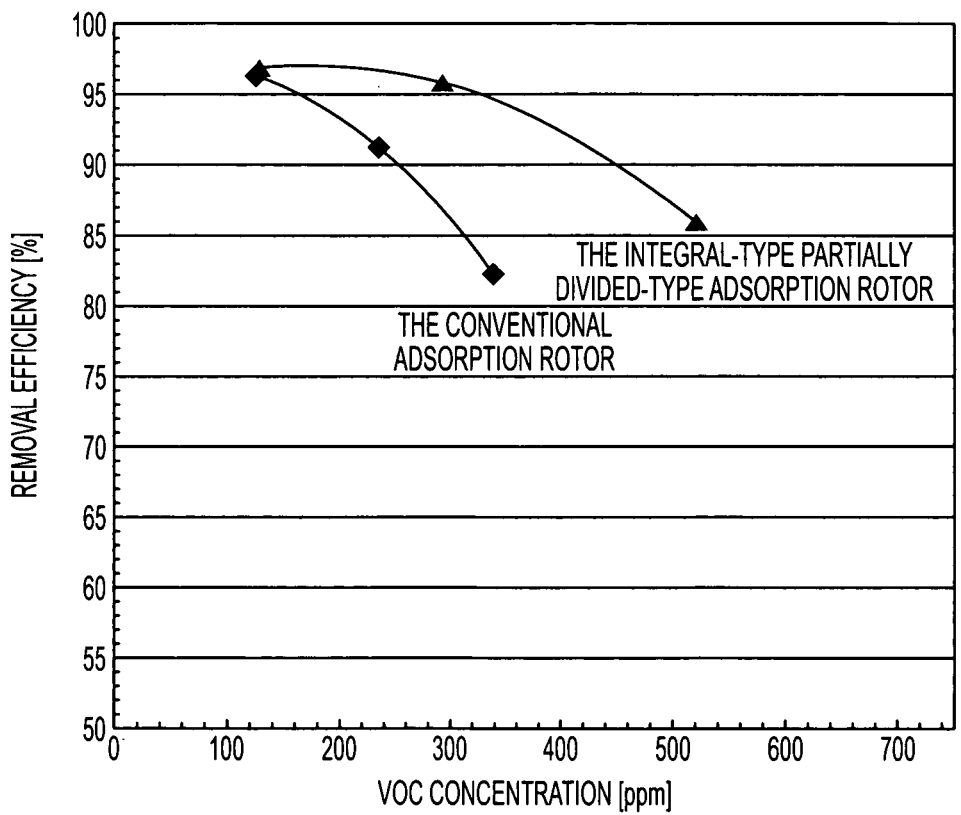
FIG. 4 is a graph illustrating a comparison of toluene extraction ratio for the conventional adsorption rotor and for the proposed integral-type partially divided-type adsorption rotor.
Figure 5:
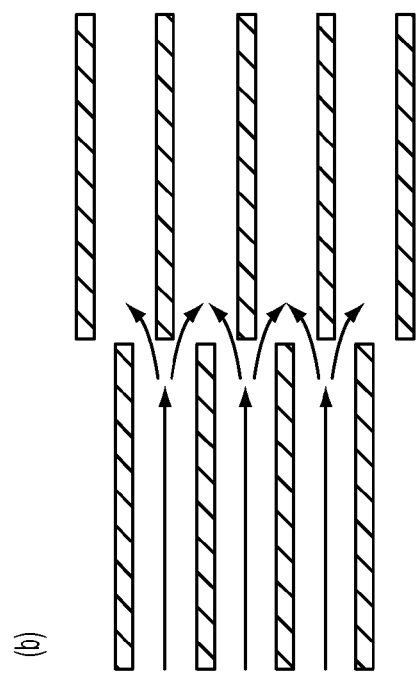
FIG. 5 shows the flows of air in the honeycombs (a) in the conventional adsorption rotor and (b) in the proposed integral-type partially divided-type adsorption rotor.
Figure 5:
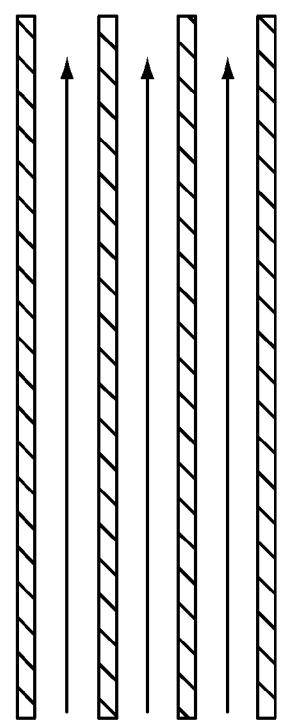

Xe FIG. 4 shows a graph for performance data. Toluene concentrations are plotted on the abscissa (the horizontal axis) against a toluene extraction ratio on the ordinate (the vertical axis) for the conventional integral type or divided-type VOC adsorption rotor, and for the proposed integral partially divided VOC adsorption rotor. It is evident that the toluene removal performance of the proposed adsorption rotor is better than the conventional adsorption rotor. This result is explained by the fact that, as shown in FIG. 5, (a) the flow of air in the conventional integral-type or divided-type VOC adsorption rotor is laminar. Part (b) of FIG. 5 shows that for the proposed device where honeycombs are divided in the width direction, a gap arises in the honeycombs, resulting in the turbulent flow, such that the air being processed uniformly hits the downstream honeycombs where adsorbents are supported. This leads to an improvement in performance. This effect can be brought about by making the honeycomb size of the attachment-and-detachment adsorption rotor element 6 smaller than the integral-type adsorption rotor element 1.

With the proposed adsorption rotor, only the surface side of the adsorption rotor needs to be detached and replaced, when performance of the adsorption rotor element degrades. By this procedure, performance can be restored to an almost new state.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide v. DIRECTV,* 69 USPQ2d 1865 (Fed. Cir. 2004).

The invention claimed is:

1. An adsorption rotor comprising:
   a boss;
   a fixed honeycomb-shaped adsorption element having a fixed state to the boss; and
   an attachable and detachable honeycomb element, which can be detached and replaced, the attachable and detachable honeycomb element being divided into two or more fan-shaped sectors which are each formed more thinly than the fixed honeycomb-shaped adsorption element, wherein
   the fixed honeycomb-shaped adsorption element has an aggregate made of metal to which the fan-shaped sectors of the attachable and detachable honeycomb element can be installed.

2. The adsorption rotor according to claim 1, wherein
   the adsorption rotor adsorbs a substance from a process gas,
   the process gas enters a process gas entrance side of the adsorption rotor, and
   the fan-shaped sectors of the attachable and detachable honeycomb element are located so as to form a surface of the process gas entrance side of the adsorption rotor.

3. The adsorption rotor according to claim 1, wherein
   the adsorption rotor desorbs a substance by passing a reprocessing gas through the adsorption rotor,
   the reprocessing gas enters a reprocessing gas entrance side of the adsorption rotor, and
   the fan-shaped sectors of the attachable and detachable honeycomb element are located so as to form a surface of the reprocessing gas entrance side of the adsorption rotor.

4. The adsorption rotor according to claim 1, wherein the aggregate is configured such that the fan-shaped sectors of the attachable and detachable honeycomb element are removed by moving the fan-shaped sectors in a circumferential direction of the adsorption rotor.

5. The adsorption rotor according to claim 1, wherein
   the aggregate has slots, and
   each slot is shaped to receive a fan-shaped sector, by sliding the fan-shaped sector radially inward.

\* \* \* \* \*